Feb. 21, 1967   E. C. CHAPMAN   3,304,920
CHEMICAL RECOVERY UNIT
Filed Dec. 29, 1965   2 Sheets-Sheet 1

INVENTOR.
EDWARD CORBIN CHAPMAN
BY
ATTORNEY

Feb. 21, 1967
E. C. CHAPMAN
3,304,920
CHEMICAL RECOVERY UNIT
Filed Dec. 29, 1965
2 Sheets-Sheet 2
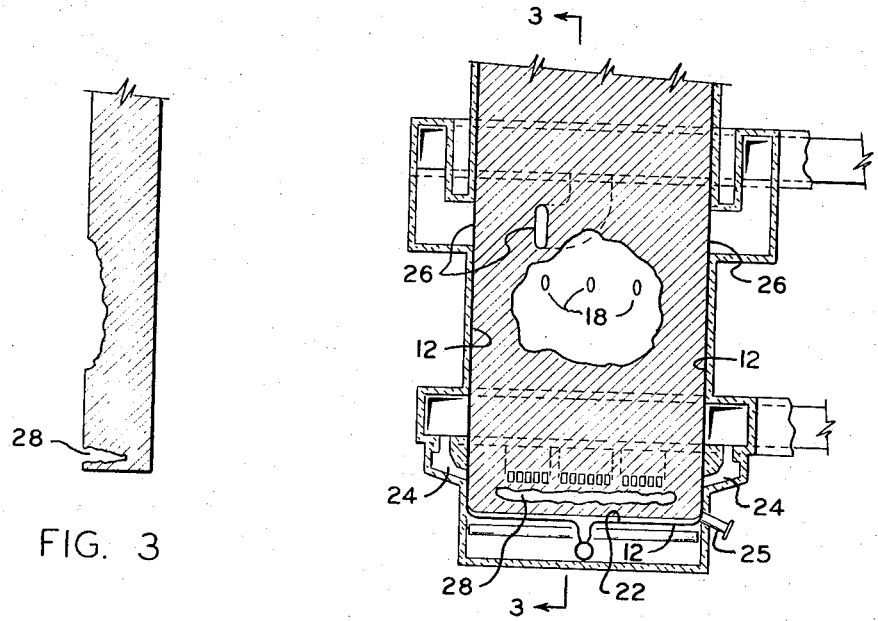
FIG. 3
FIG. 2
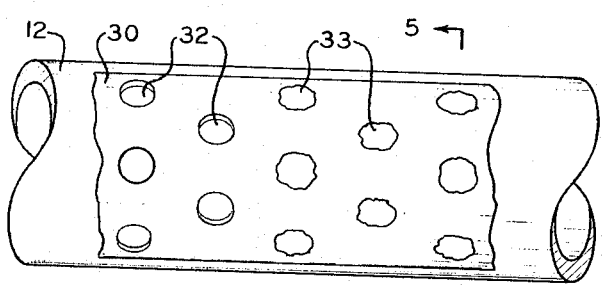
FIG. 4
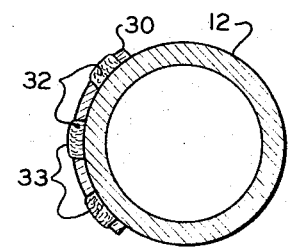
FIG. 5
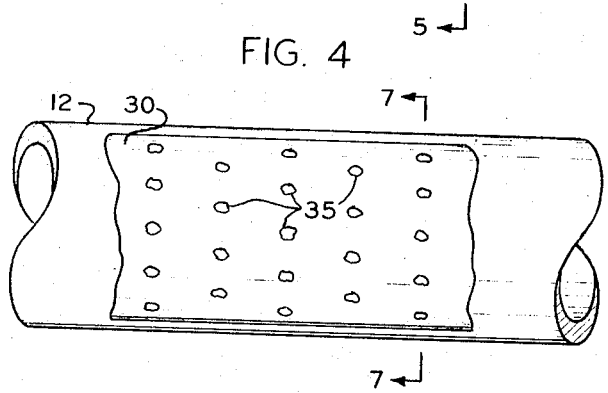
FIG. 6
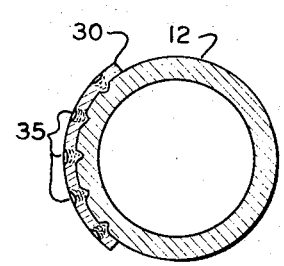
FIG. 7
INVENTOR.
EDWARD CORBIN CHAPMAN
BY
*Eldon H. Luther*
ATTORNEY

United States Patent Office 3,304,920
Patented Feb. 21, 1967

3,304,920
CHEMICAL RECOVERY UNIT
Edward Corbin Chapman, Lookout Mountain, Tenn., assignor to Combustion Engineering, Inc., Windsor, Conn., a corporation of Delaware
Filed Dec. 29, 1965, Ser. No. 517,343
3 Claims. (Cl. 122—7)

This invention relates generally to chemical recovery units employed in the pulp and paper industry wherein the so-called black liquor produced from the kraft pulping process is introduced into a furnace with the burnables in this liquid being burned therein and with the non-burnable chemicals being smelted and thus recovered. These recovery units are steam generators, the furnaces of which are lined with steam generating tubes, and this invention is concerned with an improved recovery unit operating at a relatively high steam pressure with specific precautions being taken to prevent tube deterioration in the lowermost region of the furnace.

There has, in recent years, been a trend in the design and use of chemical recovery units to increase the pressure of the unit, i.e., the pressure of the steam produced by the unit for use in various processes and apparatus within the pulping and paper making plant. As a result of this increase in pressure, the metal temperature of the steam generating tubes that line the furnace of the chemical recovery unit has accordingly, increased. It has been found that at steam pressures of approximately 900 lbs. per sq. inch and above there has developed a serious problem with regard to metal wastage of the steam generating tubes in the lowermost region of the furnace, i.e., in the region below the primary air ports. The present invention overcomes this problem by providing, in a particular manner, a protective metallic shield over the portion of the tubes in this region which is directed inwardly of the furnace.

In the operation of these chemical recovery units the black liquor is sprayed into the furnace at a location spaced well above the bottom of the furnace. This liquor has a substantial moisture content and most of this moisture is driven from the liquor spray upon its introduction into the furnace because of the high temperature in the furnace and the hot gases passing upwardly through the furnace and the spray. The solids that remain after thus removing the moisture fall onto the bottom or hearth of the furnace and form a roughly truncated pile. During the descent to the hearth some of the lighter volatiles are driven from these solid particles and the remaining volatiles are liberated and the combustible material in the solids burned in this pile with the combustion being supported by the introduction of primary air at locations spaced somewhat above the bottom of the furnace. This air is introduced through ports such that it is directed generally over and upon the pile of material. Some burnables are carried up through the furnace and are consumed above the location of liquor introduction with the secondary air being introduced for this purpose.

The most severe operating conditions insofar as deterioration of the tube metal that lines the furnace walls is encountered at the location immediately below the primary air introduction ports. A high rate of heat absorption is present at this location and, accordingly, the tube metal temperatures on the furnace walls tend to be higher at this location than at other locations. Furthermore, there is at this location an interface or juncture between the burning material disposed on the furnace floor and the side wall of the furnace.

In accordance with the present invention the problem of metal wastage at this particular location of the furnace is solved by providing stainless steel shields over the surfaces of the tubes directed inwardly of the furnace. These shields take the form of sheet metal formed in a manner to conform to the tube surface. These shields are welded to the tubes in such a manner as to insure that they are securely fastened thereto and so that good heat exchange relation between the shield and the tube is provided. To achieve this latter result the welds must be in relatively closely spaced relation. Two forms of shields or fastenings are uitilized, one of which is defined as a plug welded shield with the other as a spot welded shield. In the plug welded shield the conforming sheet metal is provided with numerous openings uniformly dispersed throughout its area. These openings are in relatively closely spaced relation and the shield is attached to the tube by welding at each of these openings with the weld metal completely filling the opening so that the shield provides a continuous and impervious metallic layer intermediate the tube surface and the interior of the unit. In the spot welded shield arrangement the conforming sheet metal is impervious and is placed over the tube surface and spot welded at numerous locations to the tube. The spot welds are more closely spaced than the plug welds since the plug welds are larger in area and, accordingly, provide better heat transfer than the spot welds. The spot welds are uniformly distributed throughout the area of the shield.

Accordingly, it is an object of the present invention to provide an improved chemical recovery unit operating at a steam pressure of approximately 900 lb. per sq. inch or above.

A further object of the invention is to provide such an improved chemical recovery unit wherein specific precautions are taken to prevent tube metal wastage of the steam generating tubes in the region of the furnace below the primary air ports.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIGURES 2 and 3 are detailed sectional views of the lower region of the chemical recovery furnace indicating particularly the regions wherein metal wastage of steam generating tubes is a problem at pressures of approximately 900 lb. per sq. inch steam pressure or above;

Figure 1:
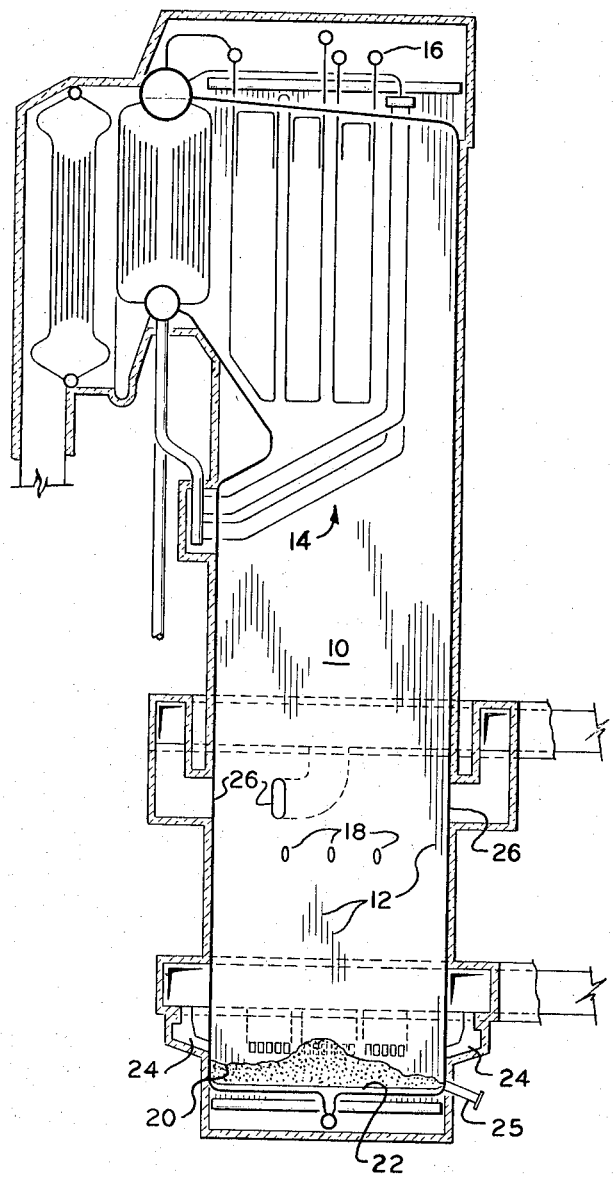
FIGURE 1 is a sectional view of a chemical recovery unit embodying the present invention.

FIGURES 4 and 5 are detailed views showing the plug welded shield construction with this shield being positioned at the region of the furnace below the primary air ports; and FIGURES 6 and 7 are views similar to those of FIGURES 4 and 5 but showing the spot welded shield construction.

Referring now to the drawings wherein like reference characters are used throughout to designate like elements, the illustrative and preferred embodiment of the invention as depicted therein includes a chemical recovery unit that has a furnace 10. The walls of this furnace are lined with steam generating tubes 12 that may be in generally tangent relation or may be in closely spaced relation with the space intermediate the tubes bridged by a fin. The tubes 12 that line the furnace 10 form part of the heat exchange surface of the chemical recovery unit with there being additional heat exchange surface indentified generally as 14 at the upper region of the unit. The tubes 12 carry a mixture of steam and water at saturation temperature for the particular pressure at which the unit is operated with this mixture passing upwardly through these tubes. The illustrative steam generator is operative to produce steam at 950 lb. per sq. inch pressure with this steam being conveyed from the header 16 to a desired point of use and with this steam being superheated to a desired value such as 900° F.

Residual liquor obtained from the kraft pulping process is introduced into the furnace 10 through the nozzles 18. The liquor thus sprayed into the furnace descends downwardly toward the furnace bottom passing through an upwardly rising stream of combustion gases such that a majority of the moisture in the liquor is immediately evaporated with the solid particles falling downwardly through this rising combustion gas stream and forming a pile 20 on the hearth or bottom 22. A portion of the burnables are consumed during this descent through the furnace with additional burnables being consumed on the pile 20 and with the non-burnable chemicals being smelted and periodically withdrawn through the discharge spout 25.

Combustion supporting air is introduced into the furnace at two locations. The primary air is introduced through nozzles 24 spaced relatively close to the bottom as, for example, 3 feet above the furnace bottom, while the secondary air is introduced through the nozzles or ports 26 located above the liquor introduction nozzles 18.

As previously mentioned chemical recovery units operating an approximately 900 lb. per sq. inch steam pressure or above have encountered a serious metal wastage problem of the tubes 12 at the location below the primary air nozzles identified in FIGURE 1 as 24. The particular location of this serious corrosion problem is identified in FIGURES 2 and 3 as the general area 28. The apparent reason for this is that with the higher pressures the saturation temperature within the tubes 12 is elevated which, in turn, causes the tube metal temperature to rise. The region immediately below the primary air ports 24 is a region of high heat absorption such that the tube metal temperature here is substantially elevated and, furthermore, it is at this location that the burning on the upper surface of the pile joins or contacts the side walls of the furnace. In any event and for whatever reason, serious tube metal wastage problems of the steam generating tubes on the upright furnace walls in units operating at the aforementioned steam pressure and above have been experienced.

This problem is extremely serious for several reasons one of which is that a tube rupture in a chemical recovery unit creates a very hazardous condition in that mixing water with the molten smelt in the bottom of the unit causes serious explosions which have created extensive property damage and been the cause of loss of life for many operating personnel. Moreover, replacement of the tubes in the lower region of the chemical recovery units is difficult since the lower region is liquid-tight so as to contain the molten smelt and, therefore, adjacent tubes or abutting fins are welded together to form a fluid-tight wall section.

To overcome this problem of metal wastage of the steam generating tubes on the upright furnace walls at the location below the primary air nozzles 24, there is maintained, in accordance with the present invention, a layer of stainless steel metal over the portion of the tubes in this region that is directed inwardly of the furnace 10. This layer of stainless steel is applied to these tube portions in the form of a conforming sheet or member 30 which may have a thickness of 3/32 inch and which is securely welded to the tube. In the embodiment of FIGURES 4 and 5 there is provided a conforming sheet 30 which has a plurality of openings 32 generally uniformly distributed throughout its area. The sheet or member 30 is placed against the tube 12 and is securely welded in place at the location of each of the holes 32. This operation is referred to as plug welding and the welding is such that the holes 32 are filled with metal 33 with this weld metal also being stainless steel and preferably having the same characteristics as the sheet 30. It is essential that the openings 32 be in closely spaced relation, and it is preferred that the adjacentmost openings be not more than 13/16 inch apart. The purpose of this is to securely fasten the sheet 30 to the tubes and to provide for good heat exchange relation between this sheet and the tube in order that the temperature of this stainless steel protecting sheet will not become excessive at locations intermediate the plug welds. As the pressure of the steam generator increases, the temperature of the saturated fluid in the tubes 12 will also increase. There is currently in operation chemical recovery units which are designed to generate steam in the 1200 to 1300 lbs. per sq. inch region. It has been found that a center-to-center spacing of 13/16 inch with holes 3/16 inch in diameter and utilizing Type 304 stainless steel of 3/32 inch thickness of satisfactory results in a chemical recovery unit operating at 950 lb. per sq. inch steam pressure are obtained. With these characteristics it is found that the temperature of the stainless steel protecting sheet does not become excessive at locations intermediate the plug welds. For units operating at higher pressures the holes 32 and thus the plug welds may be positioned in more closely spaced relation if desired in order to provide greater assurance that the metal of the protecting sheet intermediate the plug welds will not become excessive such that it will be wasted away by the conditions within the furnace 10.

In the embodiment of FIGURES 6 and 7 the conforming sheet or shield 30 is spot welded to the tube 12 rather than being plug welded as in the embodiment previously described. With this spot welded arrangement the sheet 30 is imperforate with there being numerous spot electric resistance welds 35 (known as spot welds) disposed throughout the area of the sheet 30 and with these welds being effective to join the sheet 30 with the tube 12. This embodiment is particularly useful in new work, i.e., the manufacture of new chemical recovery units, where the protective shields may be applied to the tubes in the shop. Here it will be economical to employ spot welding. This would not be true in the field wherein the spot welding would be relatively difficult and thus the plug welded embodiment would then be preferred. With the spot welded arrangement the spot welds 35 would be considerably closer together than the plug welds 32 for the reason that the spot welds are of decreased area relative to the plug welds and thus to obtain the desired heat transfer between the shield and the tube the spot welds will be more closely spaced than the plug welds. In lieu of spot electric resistance welds, a continuous or seam electric resistance weld may be utilized. In such case, the welds are overlapped and the shield welded to the tube throughout its entire overlying area of the tube. This, in effect, is joining the electric resistance welds.

By thus providing this protective sheet over the inwardly directed surface of the tubes 12 in the region of the furnace below the nozzles 24, the wastage of the metal of these tubes is prevented and the effect is to present at this location a stainless steel protection that extends all the way around the upright furnace walls in this area of the furnace. It should be brought out that the steam generating tubes that line the furnace walls cannot themselves be made of stainless steel because of water-side problems and particularly because of stress corrosion cracking caused through contact of the boiler water with the metal at elevated temperatures.

It will thus be apparent that a relatively simple and highly statisfactory solution to the metal wastage problem of the steam generating tubes in chemical recovery units operating within the pressure range previously mentioned is provided with the application of these stainless steel protecting members in accordance with the invention.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A chemical recovery unit having an upright furnace into which black residual liquor produced from kraft pulping process is introduced for burning and smelting, said furnace having the inner surface of its upright walls lined with steam generating tubes forming part of a steam generating system operative to generate steam of at least 900 pounds per square inch, these walls having primary air induction ports therein spaced somewhat above the furnace bottom for directing air inwardly toward a pile of smelt and burnables on the bottom of the furnace, said steam generating tubes at the region below said ports having secured to their surface that is directed inwardly of the furnace a stainless steel sheet member conforming to the tube surface and having numerous generally uniformly distributed openings throughout the area thereof, each of said members being plug welded to its associated tube by filling the openings with weld metal and with said weld metal also being of stainless steel whereby there is provided at this region of the furnace a stainless steel protection that extends all the way around the furnace.

2. The chemical recovery unit of claim 1 wherein said stainless steel member is comprised of Type 304 stainless steel.

3. The organization of claim 1 wherein the openings provided in said stainless steel protecting member are spaced not more than $13/16$ inch apart.

References Cited by the Examiner

UNITED STATES PATENTS

| 2,391,108 | 12/1945 | Trainer | 122—6 |
| 2,789,881 | 4/1957 | Hochmuth | 122—7 |
| 3,048,154 | 8/1962 | Braddy | 122—7 |
| 3,139,866 | 7/1964 | Lumm et al. | 122—6 |

KENNETH W. SPRAGUE, *Primary Examiner.*